UNITED STATES PATENT OFFICE.

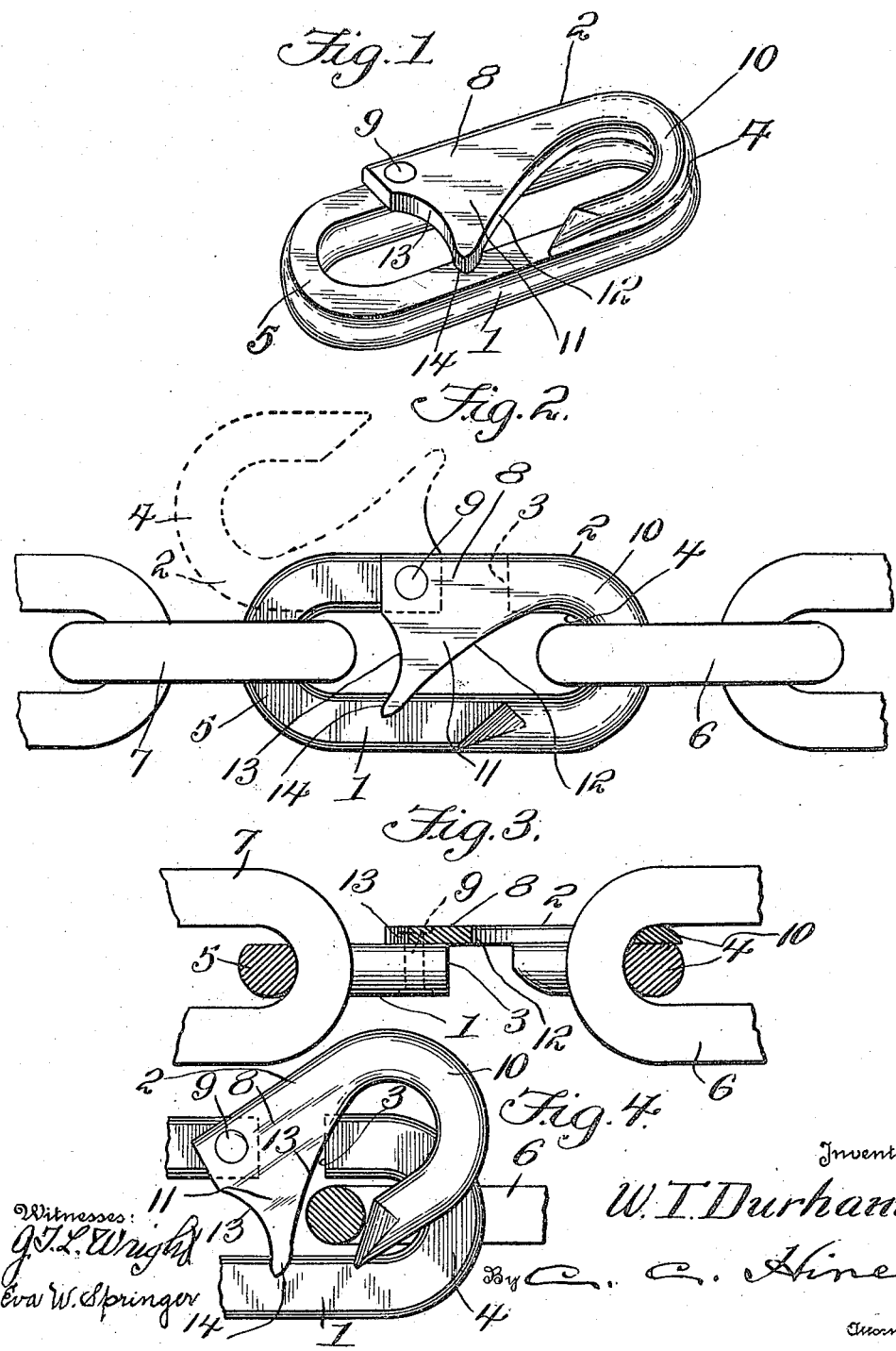

WILLIAM T. DURHAM, OF RIDGE SPRING, SOUTH CAROLINA.

COUPLING-LINK.

1,220,614.

Specification of Letters Patent.

Patented Mar. 27, 1917.

Application filed February 28, 1916. Serial No. 80,890.

*To all whom it may concern:*

Be it known that I, WILLIAM T. DURHAM, a citizen of the United States, residing at Ridge Spring, in the county of Saluda and State of South Carolina, have invented new and useful Improvements in Coupling-Links, of which the following is a specification.

My invention relates to coupling links designed in general for the various uses for which coupling or lap links are commonly employed, the primary object of the invention being to provide a coupling link which possesses maximum strength and durability, is adapted to be used without liability of the movable member casually opening and permitting separation of the coupling elements, and which is inexpensive of construction and requires a comparatively small amount of fine machining in manufacture.

A further object of the invention is to provide a coupling which entirely obviates the necessity of forming the main link or stationary member with recesses or rabbeted portions to receive any part of the movable or locking member, and which furthermore is so constructed as to overcome any tendency of the movable member to bind or hang in use, so that it may be easily and conveniently opened and closed by hand manipulation.

The invention consists in the features of construction and the combination and arrangement of parts hereinafter described and claimed, reference being had to the accompanying drawing, in which:

Figure 1 is a perspective view of a coupling link embodying my invention, showing the movable closure member in closed position;

Fig. 2 is a side elevation of the same showing the coupling link engaged with two elements to be coupled, and showing in full and dotted lines the closure member in closed and opened positions;

Fig. 3 is a vertical longitudinal section through the parts shown in Figs. 1 and 2; and Fig. 4 is a fragmentary side elevation illustrating the mode of applying or releasing one of the coupled elements.

In carrying my invention into practice, I provide a link preferably of elliptical or oval form, and comprising a body or stationary member 1 and a movable closure member 2. The body 1 is provided at one side with a lateral slot or opening 3, which is disposed on one side of the transverse center thereof, said slot or opening being arranged somewhat closer to the end portion 4 of the body than to the opposite end portion 5 thereof. This slot or opening 3 constitutes a passageway by means of which links or other elements 6 and 7 to be coupled may be introduced into the link body 1 so as to be disposed at the opposite ends 4 and 5 thereof and to be connected thereby in a reliable and secure manner.

The closure member 2 comprises a substantially oblong rectangular body portion 8 in the form of a flattened plate which is substantially of the same width as the adjacent side of the link body 1. This plate 8 is pivotally connected to one side of the link on one side of the slot or passageway 3, as by means of a pivot pin or rivet 9 passing through the plate and link body, said pin extending through the terminal portion of the link body forming a part of the end portion 5. At its opposite or free end the plate 8 carries a locking hook 10 which is formed to conform substantially to the contour of the end portion 4 of the link body 1, so as to lie in parallel relation thereto when the closure member is in closed position.

The plate 8 is provided with a laterally extending guard wing 11 located on the same side thereof as the hook 10, and which is designed, when said hook 10 is in closed position, to separate the two end portions of the opening in the coupling body 1 from each other and to prevent interference between the coupled elements 6 and 7. This wing, furthermore, serves to prevent the coupling elements from having undue movement or play and working toward the passage 3, as will be readily understood. As shown, the wing is approximately of triangular form, having a straight side which is integral with the plate 8, a curved or concave side 12 which faces the bill of the hook 10, and a concaved or recessed base 13 terminating in a projecting guard point at its angle of intersection with the side 12.

When the closure member is arranged in closed position, as shown in Figs. 1, 2 and 3, it will be seen that it closes the passageway 3 and separates the end portions of the openings in the link body from each other, thus keeping the coupled members 6 and 7 spread apart and at the same time so disposing said parts that any pressure upon the closure member from either coupled element tending to force said closure member open will be counteracted and resisted by the other closure member, thus obtaining absolute security of connection. The element 6 may be released at any time by moving it toward the center of the link body 1 to a sufficient degree to allow the hook 10 to swing clear, whereupon the hook may be swung outwardly to the dotted line position shown in Fig 2 from the preliminary position shown in Fig. 4, thus permitting the element 6 to be withdrawn through the opening 3. When it is desired to release the element 7 this may be effected by swinging the closure member open in a similar manner, and it will be evident from the foregoing description of the construction that either of the connected elements may be applied or released independently of the other. The mode of applying the elements to be connected will be obvious from the foregoing description, considered in connection with Figs. 2 and 4.

Having thus described my invention, I claim:

A coupling link comprising a link body having parallel sides and curved ends, one of said sides having an opening therein for the passage of a link, and a closure member for the link slot having a substantially triangular portion and a curved hook-shaped end, one corner of the triangular portion being pivoted to the link body adjacent the side opening, the outer side of the closure member lying flush with the outer side of the link body when the parts are in locked position, one side of the triangular portion within the link body being abruptly concaved, and the other side thereof being curved continuously from the curved hook-shaped end, the free end of the triangular-shaped member overlapping the opposite parallel side of the link body whereby pressure upon the continuously curved side of the triangular portion will further hold the closure member in locked position.

In testimony whereof I affix my signature in presence of two witnesses.

WILLIAM T. DURHAM.

Witnesses:
F. B. GUNTER,
L. J. SMITH.

Copies of this patent may be obtained for five cents each, by addressing the "Commissioner of Patents, Washington, D. C."